United States Patent [19]
McGrane

[11] Patent Number: 5,426,697
[45] Date of Patent: Jun. 20, 1995

[54] DUPLEX COMMUNICATION COUPLER SYSTEM

[75] Inventor: Kevin McGrane, Suffolk, United Kingdom

[73] Assignee: Electronic Techniques (Anglia) Limited, Ipswich, England

[21] Appl. No.: 110,374

[22] Filed: Aug. 23, 1993

[30] Foreign Application Priority Data

Aug. 28, 1992 [GB] United Kingdom ............ 9218387

[51] Int. Cl.⁶ ............................................. H04B 3/16
[52] U.S. Cl. ..................................... 379/398; 379/399; 379/400; 379/402; 379/403
[58] Field of Search ............... 379/398, 399, 400, 402, 379/403

[56] References Cited

U.S. PATENT DOCUMENTS

| | | | |
|---|---|---|---|
| 4,336,423 | 6/1982 | Morlec et al. | 379/398 |
| 4,503,289 | 3/1985 | Spires | 379/398 |
| 4,760,595 | 7/1988 | Arai | 379/398 |
| 4,866,767 | 9/1989 | Tanimoto et al. | 379/398 |
| 5,187,742 | 2/1993 | Moran | 379/403 |
| 5,249,224 | 9/1993 | Chambers | 379/398 |

Primary Examiner—James L. Dwyer
Assistant Examiner—Jacques M. Saint-Surin
Attorney, Agent, or Firm—Dorn, McEachran, Jambor & Keating

[57] ABSTRACT

The single transformer generally used in a duplex coupler for coupling local telecommunication equipment, such as a modem, to a telephone line may be replaced by a number of transformers or other suitable forms of DC isolation device which then enables each transformer and its associated circuit network to be specifically tailored to optimize the operation of the coupler system. The transmit output path 3 is connected to a transformer 2 having a center-tapped secondary winding 11 which is connected across the communication line 4. A second transformer 5 has its primary winding connected between the center-tap and the line 4, and its secondary winding coupled to the receive input 6. By optimizing each transformer the intermodulation products and other unwanted products are reduced. The coupler system may be miniaturized and the line matching components incorporated in or selected by a specific line cord designed to match the network characteristics.

14 Claims, 4 Drawing Sheets

DUPLEX COMMUNICATION COUPLER SYSTEM

The present invention relates to a duplex communication system, particularly one for use with a modem.

BACKGROUND

It is generally necessary to isolate local telecommunication equipment from the line. This is generally achieved by means of a transformer and local circuit components to provide the necessary line matching characteristics although the specific components on the line side and equipment side need to be chosen to suit the characteristics and requirements of each country. However, regardless of the specific choice of components, arrangements give rise to unwanted harmonic distortion and intermodulation products. It is desirable to reduce such unwanted products.

The demands of telecommunication development are towards greater miniaturisation. However, the scope for size reduction of transformers is limited if the shunt inductance is to be sufficiently high to permit line matching, and if the winding resistance is to be kept acceptably low.

Known circuit arrangements also suffer from a frequency response which is not flat for transmission and reception if the line has a complex impedance causing attenuation distortion.

It is an object of the present invention to seek to optimise the performance of the coupling of equipment to a telecommunication line. This may be achieved by means of optimisation of a circuit arrangement in which the isolation function is separated from the line matching requirement.

A circuit layout resembling one of the preferred embodiments of the invention and containing two transformers has been known for at least ten years. However, such circuits have been used solely to secure good transhybrid loss performance, it not having been realised that the arrangement could be optimised so as to produce a very high standard of performance in respect of transhybrid loss, matching and distortion of all kinds simultaneously.

It has been found in embodiments of the invention that:

(a) although the flux density arising from the transmission signal is greater than in known conventional arrangements, the low source impedance minimises the distortion products arising from the transmission signal;

(b) as the flux density due to the received signal from the line is small, so all intermodulation between the transmit and receive signal and distortion products arising from the receive signal in the line are very small;

(c) whatever unwanted products are produced in the transmit line isolation transformer they are reduced by the transhybrid loss of the hybrid;

(d) a high inductance transmit line isolation transformer is no longer required to achieve satisfactory match of the line;

(f) as the matching network is on the line side of the line isolation transformers it is possible to use a common coupling unit for all countries and to use a preset impedance built into the line cord or selected by means in the line cord of local equipment to provide the only necessary line matching components for any particular line impedance;

(g) when the winding resistance and leakage inductance of the transmit coupling transformer are negligibly small, the optimisation of the reference impedance to obtain optimum return loss also produces optimum transhybrid loss;

(h) if desired, the transhybrid loss can be adjusted independently of the return loss;

(i) by using an amplifier to provide feedback a low source impedance is possible;

(j) it is possible to select component values and so create a duplex communication coupler system with zero voltage insertion loss on transmit and receive.

SUMMARY OF THE INVENTION

Therefore according to the invention there is provided a duplex communication coupler system for coupling local telecommunication equipment to a telecommunication line comprising first means having a low impedance for isolating the transmit output of the local equipment from the line, second means having a high impedance for isolating the receive input of the local equipment from the line, and a matching network for coupling the first and the second means to the line.

Preferably the first and second means are transformers or opto-electronic couplers which provide DC isolation. The system may be provided with feedback which may be coupled by way of an amplifier to the transmit output of the local equipment.

Because of the different line matching requirement of different national telecommunication networks the system may be used to couple local equipment such as a modem to the line by means of a line cord containing a preselected impedance the value of which is matched to the specific equipment and the national network.

DESCRIPTION OF THE DRAWINGS

The invention will now be described by way of example with reference to the accompanying diagrammatic drawings in which.

SPECIFIC DRAWINGS

Figure 1:
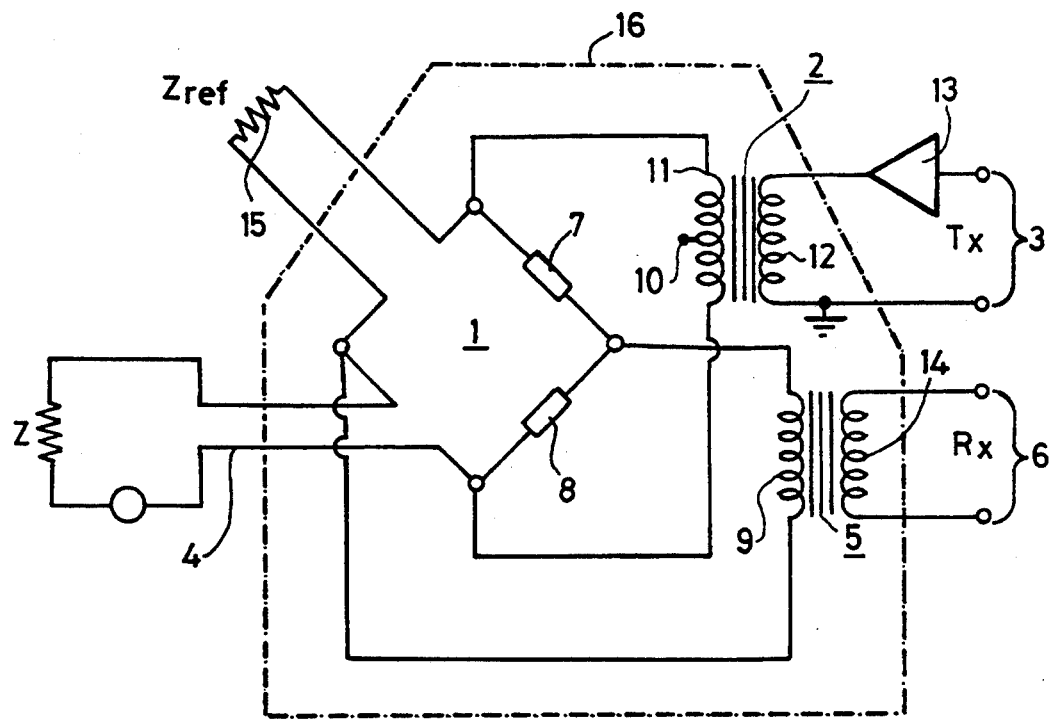
FIG. 1 shows a duplex communication coupler system suitable for coupling a modem to the telecommunication line of a national telecommunication network.

Referring now to the drawings, FIG. 1 shows a bridge 1, a first DC isolating transformer 2 coupling the transmit output 3 of a modem (not shown) to a telecommunication line 4, and a second DC isolating transformer 5 coupling the receive input 6 of the modem to the line 4. Impedance elements forming a series-connected networks which may contain reactive impedance are provided by resistors 7 and 8 in adjacent arms of the bridge 1. However as shown in other embodiments these networks may be omitted if the primary winding 9 of the transformer 5 is coupled directly or by way of a capacitor to the centre-tap 10 on the secondary winding 11 of the transformer 2. The primary winding 12 of the transformer 2 is coupled via an amplifier 13 to the transmit output 3. The receive input 6 of the modem is connected to the secondary winding 14 of transformer 5.

For any particular telecommunication network the characteristic matching parameters Z of the line 4 may be balanced in the bridge 1 by an impedance network represented by the element 15. There is a commercial advantage for the element 15 to be built into the line cord or selected by the line cord of the particular local equipment for a specific country, in which case the components within the line 16 could be constructed as a module which would be common for all countries.

By replacing the conventional single transformer of known duplex couplers with two transformers it is now possible to optimise the transformers, for example to achieve lower cost and/or to miniaturise the components so that the volume of the two optimised transformers is less than the replaced single transformer, and/or to achieve a higher level of performance within a given volume.

Figure 3:
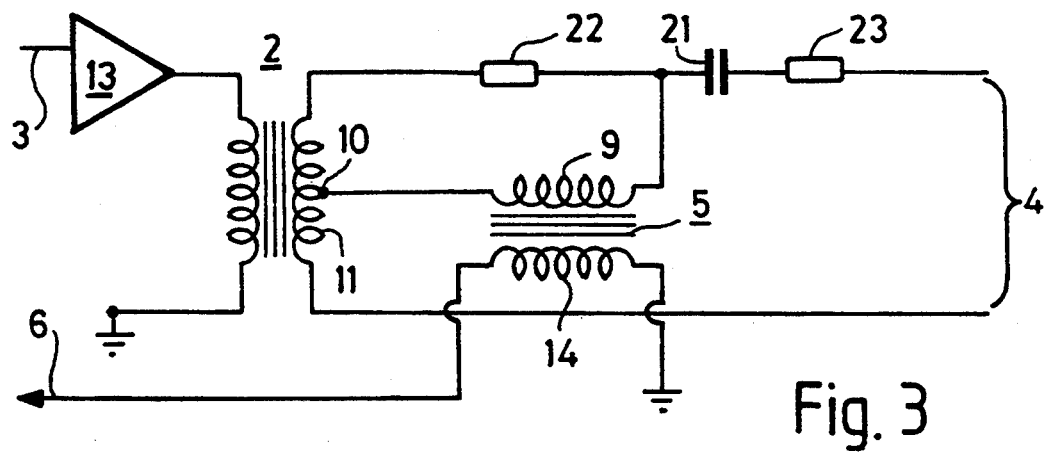
FIGS. 3 to 8 alternative embodiments of the invention.
Figure 5:
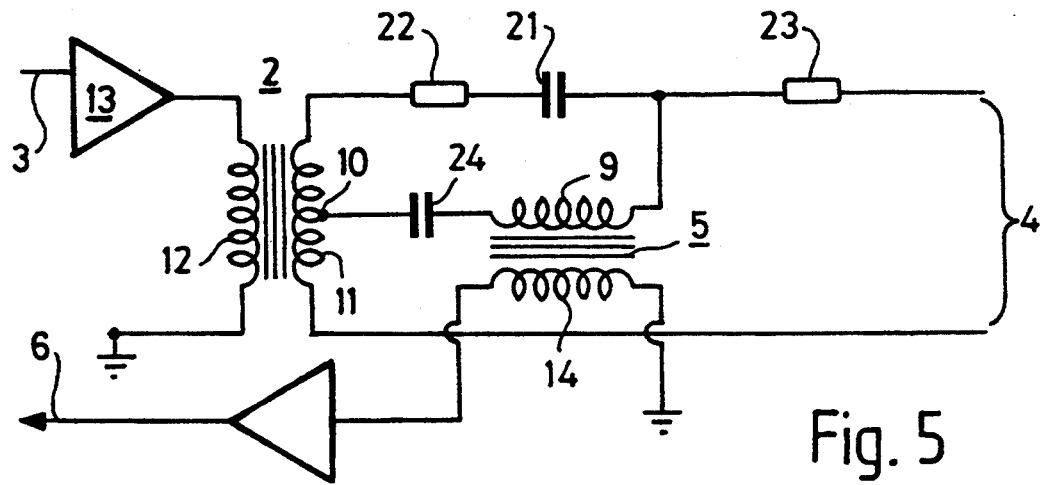

The transformer 2 is made with a low winding resistance and the transformer 5 is made with a high primary inductance. The primary inductance of transformer 2 and the winding resistance of transformer 5 are relatively unimportant. The low source impedance of the amplifier 13 minimises the distortion products of the signal generated within transformer 2. Whatever products are produced in the transformer 2 appear across the secondary winding 11 and are reduced at the receive port 6 by the transhybrid loss of the hybrid. The transformer 2 does not need to provide matching to the line as the line matching element is incorporated in the bridge 1. The selection of the values of the matching element 15 for optimum return loss simultaneously provides optimum transhybrid loss. The networks 7 and 8 enable the transhybrid loss to be adjusted independently of the return loss. However, as shown in FIGS. 3 and 5 the two networks can be replaced by the centre-tap 10 if independent adjustment of the transhybrid and return loss is not required. The centre-tap 10 may be an offset tap to provide a better impedance match if required.

It will be appreciated that as the ratios of the transformers 2 and 5 are independently selected they may be chosen to provide zero voltage insertion loss on transmit and receive modes. The flux densities due to the receive signal from the line 4 in transformers 5 and 2 are very small, because in the latter case the operating impedance of transformer 2 compared to the Z ref element 15 is very low, and in the former the number of turns of transformer 5 is large. Thus intermodulation between the transmit and receive signals is reduced, and distortion products arising from the receive signal in the line 4 are very small. As the winding resistance of the transformer 5 is not critical it is possible to use fine wire and to increase the number of turns of the winding so that very low distortion is created even in a small package transformer.

By a suitable choice of component values it is possible to create a flat frequency response for both transmit and receive modes. As previously mentioned, all the matching components are on the line-side and if required the matching network may be incorporated into a network-specific line cord, or the matching network can be selected by a network-specific line cord or by other means without switching across or communication across a DC isolation barrier. The selectable components to match the specific national characteristics may be pre-selected or selected as necessary by a switching means from a range of selectable impedances which may be incorporated in the line cord.

The operation may be further enhanced by a feedback arrangement which will be described later with reference to FIGS. 6 and 7.

Figure 2:
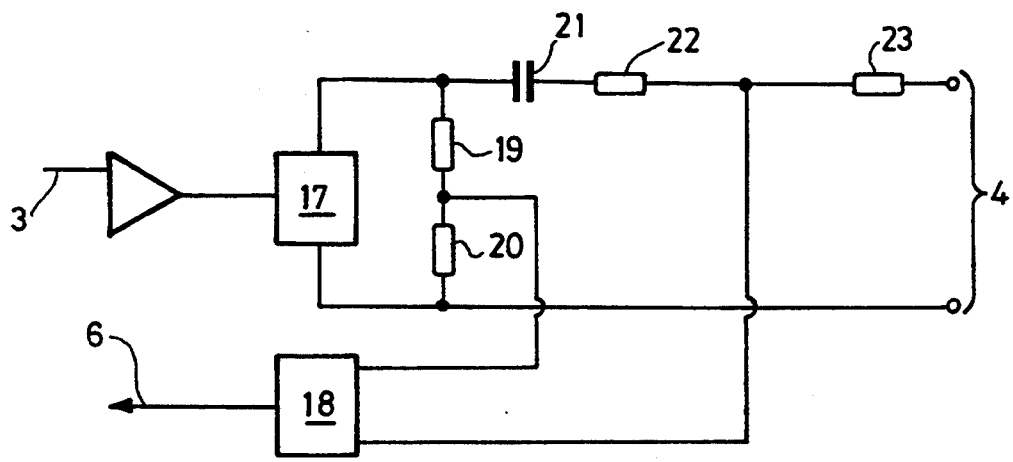
FIG. 2 shows the basic principles of the invention.

Referring now to FIG. 2 which illustrates the general principle of the system it will be seen that the transmit path 3 and the receive path 6 are coupled to DC barrier devices 17 and 18 respectively which isolate the local equipment, such as a modem (not shown) from the line 4. The devices 17 and 18 may be opto-electronic couplers or other various devices which pass the signal without forming a DC path. A divider network consisting of networks 19 and 20 provide adjustment for optimising the transhybrid loss. The divider network is coupled to the line 4 by way of a capacitor 21 and network 22 matched to the line impedance 23.

Figure 4:
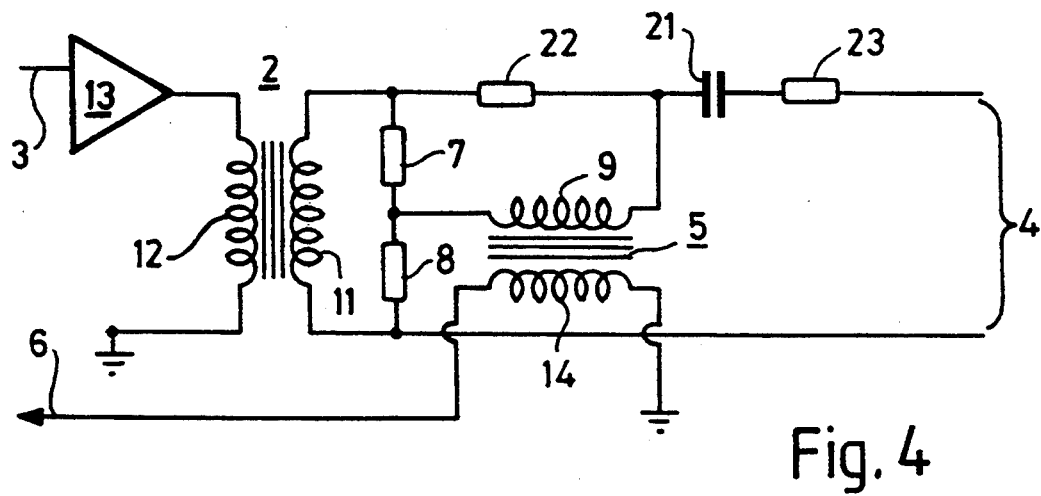

Specific realisations of the invention are shown in FIGS. 3, 4 and 5 in which the components have been given the same reference numerals as comparable components in FIGS. 1 and 2. As shown in FIG. 5 if the primary winding 9 of the transformer 5 is directly coupled to the line 4 it is generally necessary to provide a capacitor 24 to isolate the transformer 2 from the line current. This additional capacitor is not required if the capacitor 21 isolates the transformer 5 from the line 4 as shown in FIGS. 3 and 4.

Figure 6:
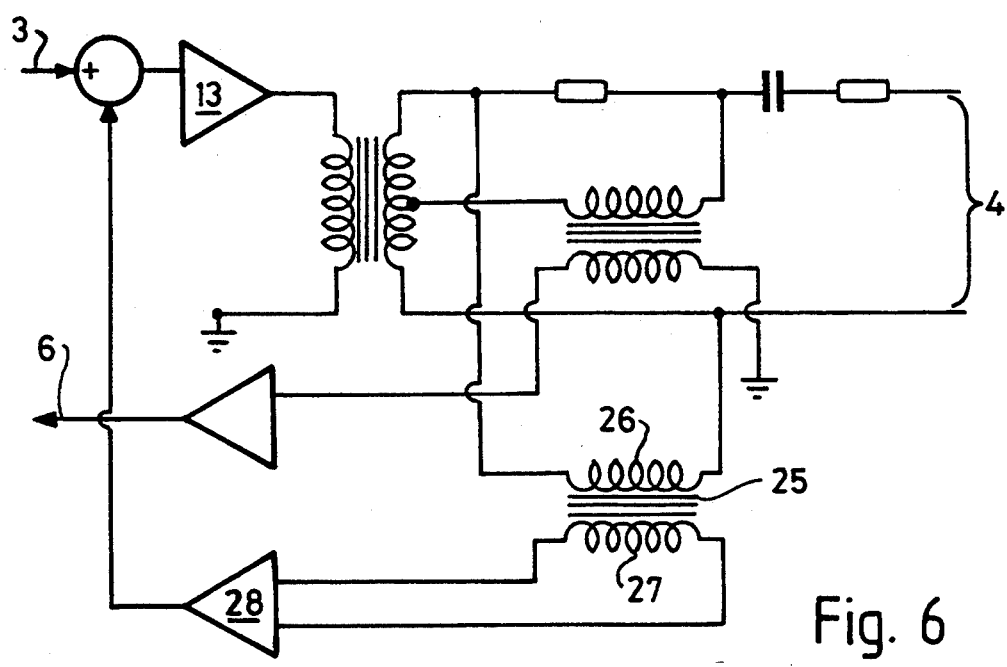
Figure 7:
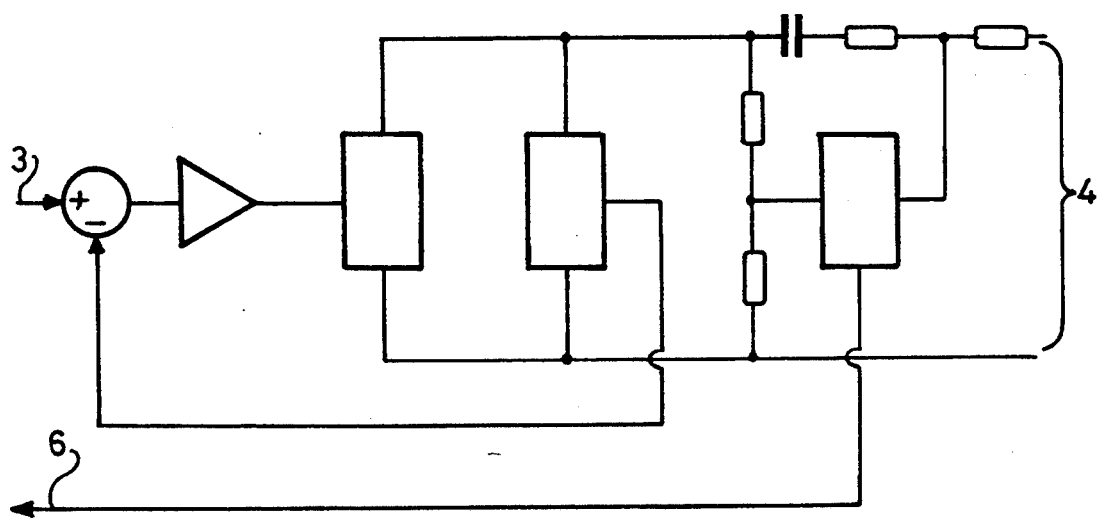

Referring now to FIG. 6 and 7 feedback may be provided to the transmit output 3. This may be achieved as shown in FIG. 6 by an additional transformer 25 having its primary winding 26 coupled across the bridge and its secondary winding 27 driving an amplifier 28 the output of which is feedback to the transmit output 3. The general principle is illustrated in FIG. 7 for any suitable form of DC barrier isolation device.

Figure 8:
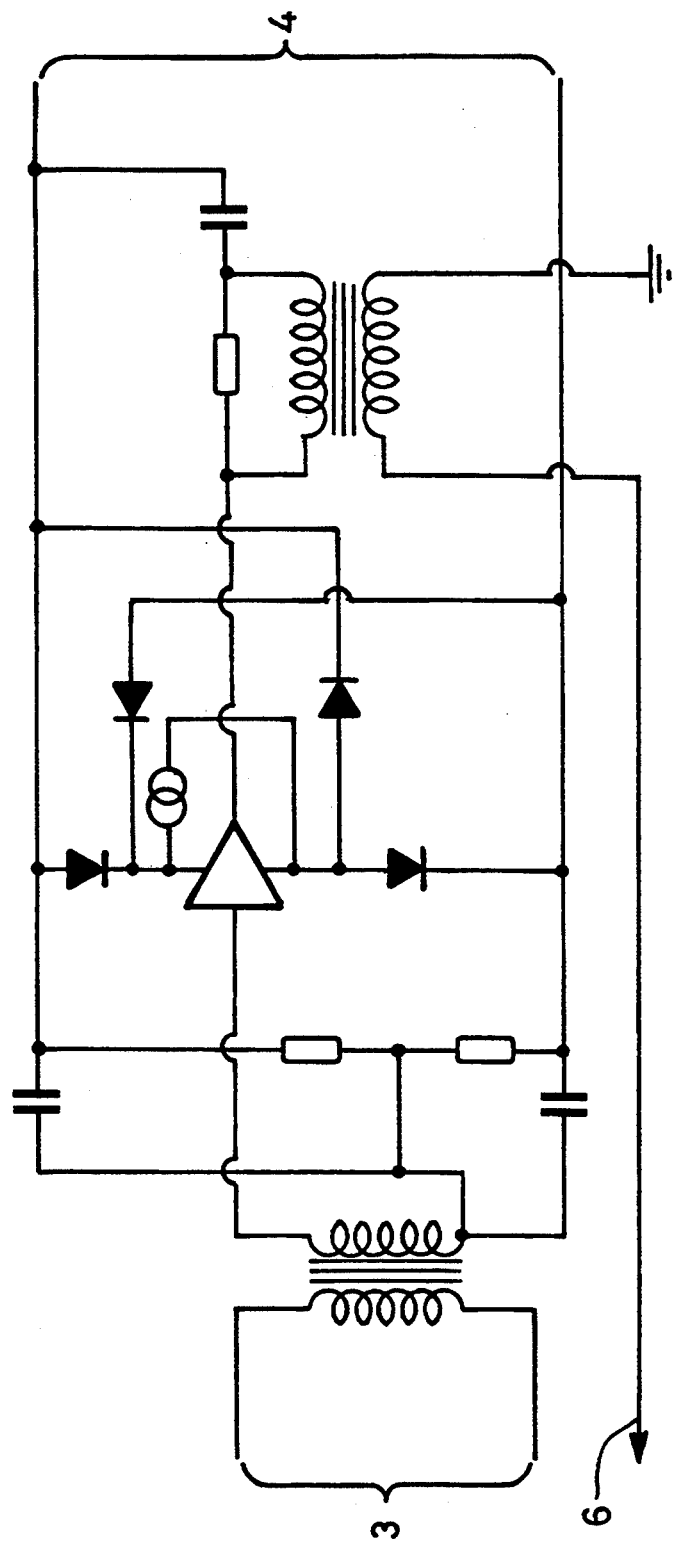

FIG. 8 shows a further embodiment of the invention. It will be appreciated that other forms and applications of the invention are possible within the inventive concepts as described above and as shown in the accompanying drawings

I claim:

1. A three port duplex communication coupler system for coupling local telecommunications equipment to a telecommunication line comprising a first port for connection to the transmit output of the telecommunications equipment, a second port for connection to the receive input of the telecommunications equipment, and a third port for connection to the telecommunication line, first means having a low impedance for isolating the transmit output of the local equipment from the line, second means having a high impedance for isolating the receive input of the local equipment from the line, and a matching network for coupling the first and the second means to the line.

2. A duplex communication coupler system as claimed in claim 1 in which the first and second means consist of transformers each having a primary and a secondary winding.

3. A duplex communication coupler system as claimed in claim 2 in which the secondary winding of the first transformer means is connected from a tap to the primary winding of the second transformer means, the secondary winding of which is connected to the receive input of the local equipment.

4. A duplex communication coupler system as claimed in claim 2 in which the primary winding of the second transformer means is connected from the junction of a series-connected network placed in parallel across the secondary winding of the first transformer means, the secondary winding of the second transformer means being connected to the receive input of the local equipment.

5. A duplex communication coupler system as claimed in claim 4 in which the series connected network consists of two resistive impedance elements.

6. A duplex communication coupler system as claimed in claim 4 in which the series connected network includes reactive impedance.

7. A duplex communication coupler system as claimed in claim 3 in which the tap is connected to the primary winding of the second transformer means by way of a capacitor.

8. A duplex communication coupler system as claimed in claim 7 in which the tap is a centre-tap on the secondary winding of the first transformer.

9. A duplex communication coupler system as claimed in claim 1 in which an amplifier provides a low impedance drive from the transmit output of the local equipment to the first means.

10. A duplex communication coupler system as claimed in claim 1 in which the first means has an output which is DC isolated from its input and in which feedback is provided from the output of the first means to said input.

11. A duplex communication coupler system as claimed in claim 10 in which the said output is connected to a third DC isolation means the output of which is coupled by way of an amplifier to the transmit output of the local equipment.

12. A duplex communication coupler system as claimed in claim 1 having a selectable impedance to effect a match to the characteristic impedance of the line.

13. A duplex coupler system as claimed in claim 12 in which the selectable impedance is selected from a number of selectable impedances by a switching means.

14. A duplex communication coupler system as claimed in claim 12 in which the selectable impedance is incorporated into the line cord for the local equipment.

* * * * *